United States Patent [19]
Schmidt

[11] 3,939,893
[45] Feb. 24, 1976

[54] TIRE CORD FABRIC

[75] Inventor: Calvin P. Schmidt, Clemson, S.C.

[73] Assignee: Deering Milliken Research Corporation, Spartanburg, S.C.

[22] Filed: Oct. 25, 1974

[21] Appl. No.: 517,989

Related U.S. Application Data

[62] Division of Ser. No. 374,556, June 28, 1973.

[52] U.S. Cl. ............................ 152/362 CS; 152/359
[51] Int. Cl.² ............................................... B60C 15/06
[58] Field of Search .......... 152/362 CS, 362 R, 354, 152/357, 359

[56] References Cited
UNITED STATES PATENTS

| | | | |
|---|---|---|---|
| 2,273,200 | 2/1942 | Hoff | 152/362 CS |
| 2,934,126 | 4/1960 | Wilson | 152/362 CS |
| 2,947,340 | 8/1960 | French | 152/362 CS |
| 2,947,341 | 8/1960 | Hershey | 152/362 CS |
| 3,003,537 | 10/1961 | Engstrom et al. | 152/362 CS |
| 3,040,797 | 6/1962 | Saint Paul | 152/362 CS |
| 3,419,061 | 12/1968 | Morikawa et al. | 152/362 CS |

*Primary Examiner*—Drayton E. Hoffman
*Attorney, Agent, or Firm*—Earle R. Marden; H. William Petry

[57] ABSTRACT

A woven chafer fabric for tires which uses a round monofilament warp yarn and a bulked multifilament fill yarn.

1 Claim, 2 Drawing Figures

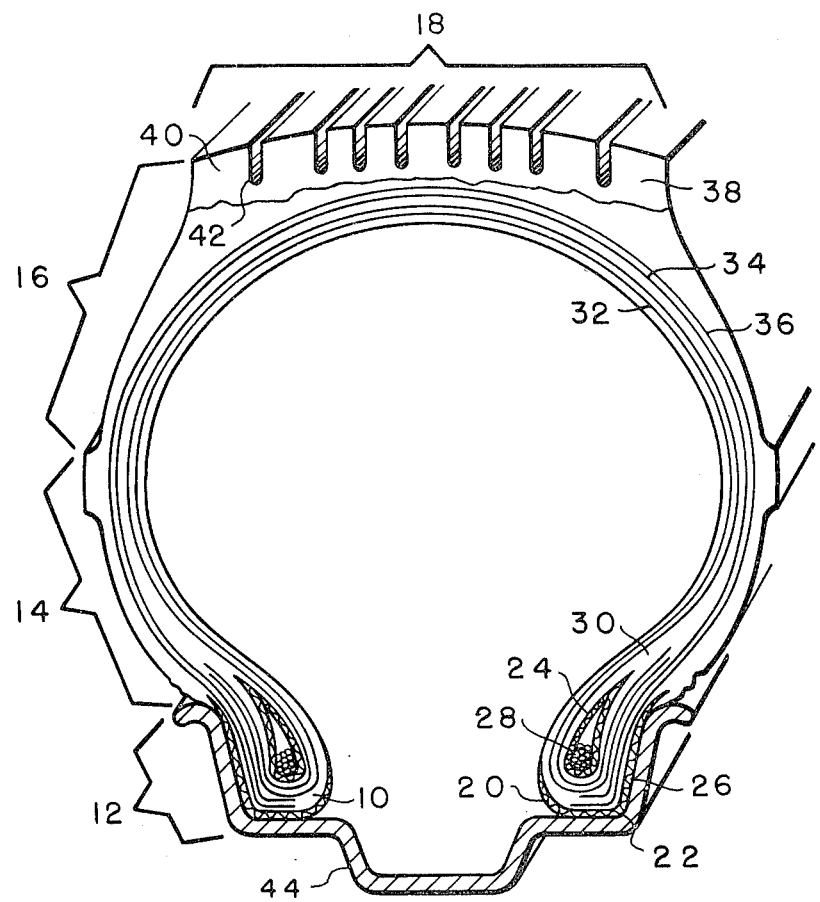
FIG. -1-
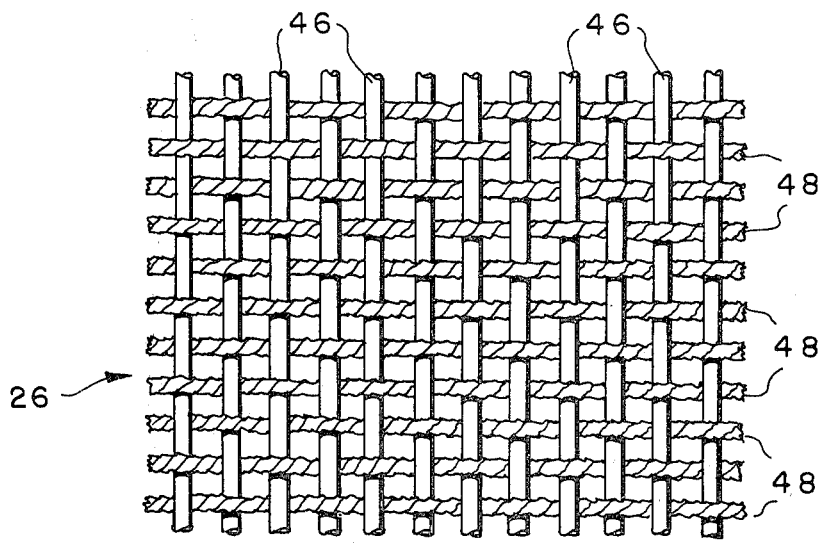
FIG. -2-

TIRE CORD FABRIC

This is a division of Application Ser. No. 374,556, filed June 28, 1973.

Automotive tires as conventionally constructed employ as a carcass a polymeric material, such as rubber, reinforced with textile cords. The wheel engaging portion of the tire is further reinforced by circumferentially extending cores of wire or other relatively rigid material. The cores are covered by strips of chafer fabric known as "flipper strips" that extend upwardly into the side walls of the tire and stiffen the latter over the exterior of the tire carcass. Extending at least partially about the beads are "finishing strips" of chafer fabric which are intended to resist abrasion of the tire by the rim flanges when the tire is mounted, as well as adding sidewall stiffness just above the bead area in the turn-up area.

Chafer fabric is conventionally prepared by flat weaving a fabric, wick-proofing and then friction calendering green rubber to both faces of the flat woven fabric and then bias cutting the laminated fabric into strips of from one to five inches in width. The step of friction calendering green rubber to the woven fabric and/or skim calendering is carried out to facilitate the ease of bias cutting of the fabric, and also in order to promote the vulcanization of the components making up the tire body in the final product.

It should be understood that the chafer fabric of this invention is a woven chafer fabric, that is to say a fabric having substantially straight warp and filling threads interlaced at substantially right angles. A woven fabric should not be confused with a braided or plaited fabric wherein individual threads are skewed and are intertwined at acute angles with each other. Plaited fabrics which are not contemplated in this invention are plaited fabrics of the type disclosed in U.S. Pat. No. 3,183,135. Plaited fabrics are not useful as chafer fabrics due to a lack of dimensional stability of the fabric structure.

It is therefore an object of the invention to provide a chafer fabric for tires which can be readily wick-proofed, calendered and molded.

Other objects and advantages of the invention will become apparent as the specification proceeds to describe the invention with reference to the accompanying drawing.

For purposes of this invention, the term "wick-proofing" may be defined as a process wherein each cord of a fabric sheet is made impervious to the passage of air. A wick-proofed fabric is essential in the preparation of tires of the tubeless type and especially high pressure tubeless tires. In tires of the aforementioned type, high air pressure in the air cavity pushes against and under the tire bead and if the fabric in the chafer is not impervious to the passage of air, air will penetrate the individual cords which then serve as conduits to wick air into the tire body causing blistering and delamination of rubber or leading to the atmosphere thereby reducing the internal load supporting air pressure of the tire with undesirable results. Any of a wide variety of wick-proofing processes are satisfactory for use in conjunction with this invention, such as, for instance, wick-proofing processes of the type set forth in U.S. Pat. No. 2,978,784.

For purpose of this invention the term "tackifying" or "rubberizing" may be defined as a process wherein a fabric is rendered amenable to being adhered to unvulcanized vulcanizable rubber. The tackifying operation may be conveniently conducted by applying a rubber solution to the fabric. A fabric which has been tackified lends itself to tire building operations by its ready adherence to green rubber so as to form rubber-fabric sandwich layers. It should be understood that any of a wide variety of tackifying or rubberizing operations may be employed in conjunction with this invention such as, for instance, the tackifying or rubberizing operations set forth in U.S. Pat. No. 2,947,343.

The bias cutting operation may involve a single cutting operation or a plurality of cutting operations with cutting operations taking place simultaneously or at varying stages of the process. While a variety of bias cutting angles may be employed for cutting the tubular woven fabric, it is preferred that an angle of from about 40° to about 50° and still more preferably about 45° be employed.

FIG. 1 is a cross section of a conventional automotive tire showing the relationship of the various components of the tire; and FIG. 2 is a schematic view of the new and improved chafer fabric used in the tire shown in FIG. 1.

Looking now to FIG. 1 a typical tire construction is shown in cross section.

Basically the tire consists of a ply turn-up portion 10, a bead area 12, a sidewall area 14, a shoulder area 16 and a tread area 18.

The ply turn-up portion 10 and the bead area 12 are composed of the bead toe 20, the bead heel 22, the bead flipper 24, the chafer fabric 26 and the insulated bead wire 28.

The sidewall area 14 and the shoulder area 16 surround the ply area of the tire consisting of the turn-up ply portion 30, the drum ply 32, the carcass ply 34 and the cap ply 36.

The tread area 18 basically consists of the cap base junction 38, the tread cap 40 and the voids 42 in the tread cap.

As briefly discussed before, the chafer fabric 26 is a rubber impregnated fabric, in the form of strips, which is applied to the bead area 12 of the tire in green tire construction. Originally the chafer strip was employed to reduce the chafing effect between the tire and the tire rim 44 and to protect the plies underneath as well as aiding in producing bead shape and firmness in the bead area. In tubeless tires it provides the further function of preventing air diffusion between the plies to prevent separation thereof and consequently must be wick-proofed.

For use as chafer fabric it is desired to employ a woven fabric which has a low end count and closed interstices between the adjacent yarns in the fabric. To this end, the chafer fabric 26, as schematically represented in FIG. 2, is a standard weave fabric having a round monofilament synthetic warp yarn 46 and a bulk multifilament synthetic fill yarn 48. In the preferred form of the invention the warp yarn is a 400 denier monofilament nylon yarn and the fill yarn is a 930 to 965 denier bulked nylon multifilament fill yarn.

The above-described fabric provides numerous advantages not present in the other chafer fabrics. The round monofilament warp allows for better stability in processing to provide 100% wick-proofing in the warp direction of the fabric. Furthermore, the round monofilament allows for better stability during calendering. The bulked multifilament fill yarn reduces the effect of shifting of the warp and fill yarns by reducing the openings or interstices between the warp and fill yarns. Furthermore, the combination of a round monofilament warp yarn and a bulked multifilament fill yarn allows for better ease of turn-up of the chafer fabric during the tire building operation.

Although I have described the preferred embodiment of my invention, I contemplate that many changes may be made without departing from the scope or spirit of my invention and I desire to be limited only by the claims.

I claim:

1. In a tubeless tire having a ply turn-up portion, a bead area, a sidewall area, a shoulder area and a tread area the improvement comprising: a chafer fabric connected to the outside of the ply turn-up area adapted to contact the inside of a tire rim, said chafer fabric being a woven fabric constructed of a round monofilament warp yarn and a bulked multifilament fill yarn.

* * * * *